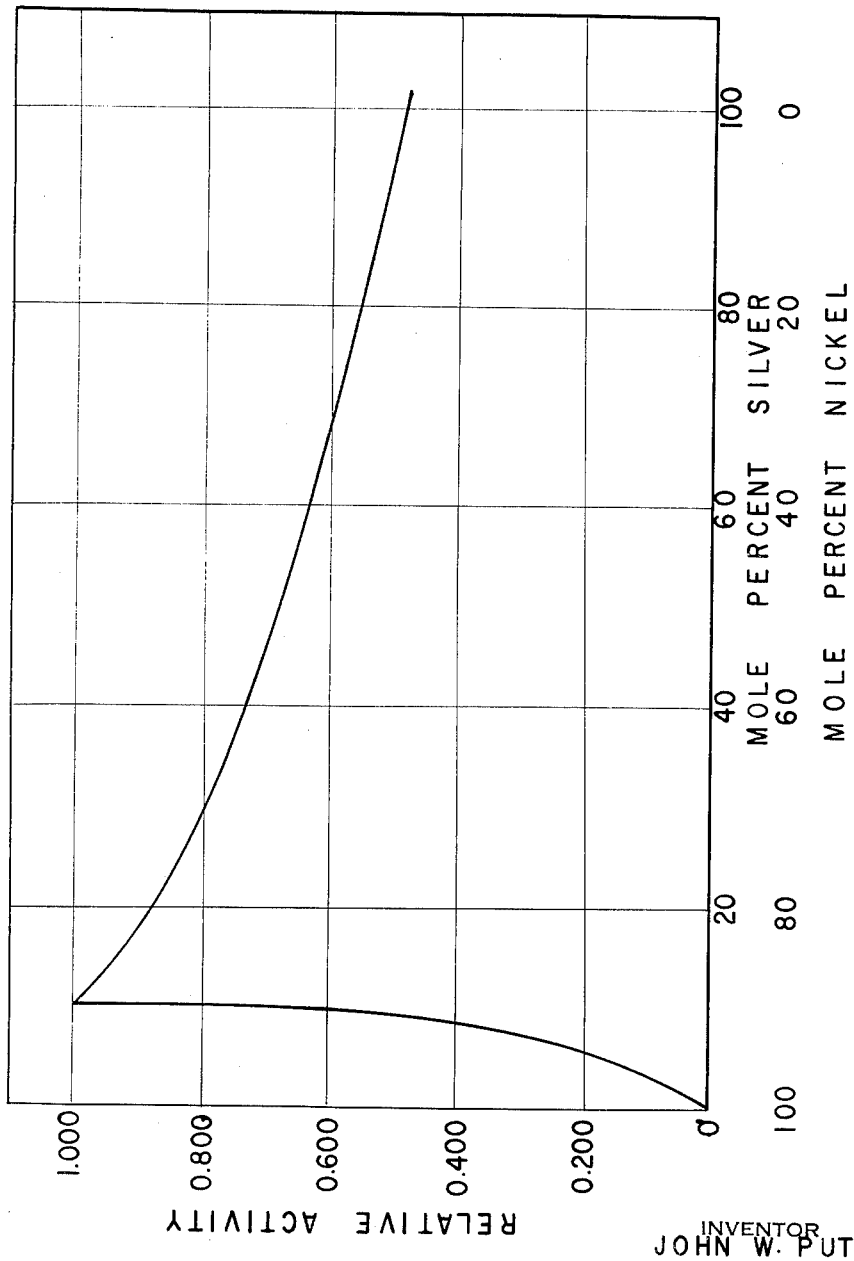

United States Patent Office 3,212,255
Patented Oct. 19, 1965

3,212,255
CATALYTIC DECOMPOSITION OF HYDROGEN PEROXIDE

John W. Putt, Newark, and Thomas K. Rice, Bloomfield, N.J., assignors to Specialties Development Corporation, Belleville, N.J., a corporation of New Jersey Original application Jan. 10, 1961, Ser. No. 81,729. Divided and this application Oct. 7, 1963, Ser. No. 320,247
2 Claims. (Cl. 60—35.4)

The present invention relates to catalysts, and, more particularly to catalysts for promoting the decomposition of hydrogen peroxide to water and oxygen.

Heretofore, samarium and/or samarium oxide packed silver screens have been utilized as the catalyst for so decomposing hydrogen peroxide in rocket motors and other types of gas generators. It has been found that when the temperature of the hydrogen peroxide and the chamber is at about 60° F., starting of the reaction is delayed, and that, at about 40° F., a cold start is practically impossible. This is because the starting response of a hydrogen peroxide gas generator is directly related to the magnitude of the rate of reaction, and the rate of reaction is a direct function of the temperature of the hydrogen peroxide.

Also, the initiation of decomposition with auxiliary hearing is unreliable and cumbersome, particularly in applications requiring retro or vernier rockets for space vehicle guidance control.

Accordingly, an object of the present invention is to provide a process for starting the decomposition reaction of hydrogen peroxide practically instantaneously even when the temperature thereof is as low as 30° F.

Another object is to provide such a process wherein the reaction, once started, is sustained by a conventional catalyst for promoting the decomposition of hydrogen peroxide.

A further object is to accomplish the foregoing in a simple and practical manner.

In accordance with the present invention it has been discovered that the decomposition reaction of hydrogen peroxide can be started practically instantaneously even when the temperature thereof is below 60° F. by contacting the hydrogen peroxide with a metalliferous catalyst such as a mixture of two metals and/or their oxides.

In decomposition chamber of dimensions which allow the catalytic bed to be of considerable size, this catalyst can serve as both the reaction starting and sustaining catalyst.

However, decomposition chambers which are of such dimensions that there is no space for a large catalytic bed, it has been found that, if the hydrogen peroxide is first passed over the starting catalyst, the reaction starts instantaneously when the hydrogen peroxide passes over or through a conventional catalytic screen and that the reaction is sustained. This is believed to be due to the fact that the starting catalyst is effective to raise the temperature of the hydrogen peroxide sufficiently so that it is at least about 65° F. when the hydrogen peroxide contacts the second catalyst.

In its preferred form, the so called starting or low temperature catalyst comprises a finely divided mixture of particles of silver and nickel and/or their oxides which are supported on aluminum oxide, the silver atoms serving as a promoter.

The term metalliferous material as used herein and in the claims is intended to include metals and/or their oxides.

A preferred way of preparing suitable catalysts is to dissolve the selected metallic nitrates in a minimum amount of distilled water. Aluminum oxide (activated alumina) pellets are then immersed in the concentrated solution of nitrates until thoroughly impregnated, and thereafter are drained and dried at 110° C. until free of water. The pellets are then heated slowly with agitation until the evolution of nitrogen oxide ceases and the temperature of the pellets has reached about 450° C.

It has been found that, by varying the mol proportions of the metals which are combined in the selected metallic nitrates or from which the catalysts are prepared by other techniques apparent to those skilled in the art, the activity of the catalyst can be adjusted to optimum or desired values.

The single figure of the drawing is a graph illustrating the foregoing effect in a silver-nickel catalyst system.

The graph indicates that peak activity occurs at approximately 10 mol percent silver and 90 mol percent nickel in such a system; but since silver is slowly extracted by hydrogen peroxide during use of the catalyst, it may be desirable to start with an excess of silver content to compensate for this gradual reduction in silver content and thereby maintain the silver content of the catalyst at a level which facilitates effective repeated use of the catalyst at or near its peak activity. Thus, the catalyst may consist of between about 10 and about 40 mol percent silver and between about 90 and about 60 mol percent nickel on its aluminum oxide support.

The graph is based on a number of tests wherein the same weight of catalysts having the specified silver-nickel mol content was used to decompose a standard volume of 91% hydrogen peroxide and the evolution of oxygen was measured for a given duration of time of activity, for example, one and one half minutes or three minutes. Maximum oxygen evolution was considered as unity and lesser oxygen evolution has been given a fractional value of unity.

A specific example of preparing the catalyst in accordance with the present invention comprises dissolving with agitation one mol of silver nitrate, $AgNO_3$, mol. wt. 121.9, and nine mols of nickel nitrate, $NI(NO_3)_2.6H_2C$ in 18.5 mols of water upon the application of heat; and then impregnating, drying and firing aluminum oxide pellets in the manner already described herein.

Two comparable catalyst beds were compared by test in a hydrogen peroxide thrust motor. One bed A was in accordance with the conventional samarium treated silver screen type, and the other bed B was in accordance with the foregoing specific example.

Bed A failed to initiate decomposition when the temperature of the hydrogen peroxide was at 40° F., whereas the bed B successfully and repeatedly initiated and sustained decomposition when the temperature of the hydrogen peroxide was as low as 30° F.

Further tests indicated that a 90% thrust could be obtained from initial cold starts within 200 to 300 milliseconds by use of the catalyst in accordance with the present invention in a two pound thrust motor and in a forty pound thrust motor. A total of eighty-one low temperature starts were demonstrated, all of which were successful.

While the catalyst in accordance with the present invention can be use advantageously in rocket chambers of conventional design, the use of this catalyst is not limited to such application but is equally useful for the decomposition of hydrogen peroxide to generate heat or to produce oxygen for breathing purposes. The catalyst further is useful to prevent the formation of hydrogen peroxide in stored compounds such as ethers and the like and thereby minimize explosion hazards.

From the foregoing description, it will be seen that the present invention provides a process and catalyst for practically instantaneously starting the catalytic decomposition of hydrogen peroxide at temperatures approaching the freezing point of the hydrogen peroxide, and for other purposes disclosed herein.

It will be understood that the details and examples hereinbefore set forth are illustrative only and that the invention as broadly described and claimed is in no way limited thereby.

This application is a division of application Serial No. 81,729, filed January 10, 1961, now abandoned.

We claim:

1. The process of promoting the catalytic decomposition of hydrogen peroxide which comprises the steps of repeatedly passing hydrogen peroxide at a temperature of about 30° F. through a porous bed of a catalyst to decompose the hydrogen peroxide, the catalyst consisting essentially of metalliferous silver and nickel supported on a carrier having an initial silver content in excess of 10 mol percent to compensate for reduction in silver content and thereby maintain the silver content at a level so that upon repeated use the catalyst approaches its peak activity.

2. The process according to claim 1, wherein the catalyst during repeated use consists essentially of between about 10 and about 40 mol percent silver and between about 90 and about 60 mol percent nickel.

References Cited by the Examiner

UNITED STATES PATENTS 3,019,197  1/62  Saunders _____ 60—35.4 X

CARL D. QUARFORTH, *Primary Examiner.*